United States Patent [19]

Foley et al.

[11] Patent Number: 4,822,712

[45] Date of Patent: Apr. 18, 1989

[54] REDUCTION OF SELENIUM ALLOY FRACTIONATION

[75] Inventors: Geoffrey M. Foley, Fairport; Santokh S. Badesha, Pittsford; Paul Cherin, Fairport; Kenneth J. Pheilshifter, Rochester; Philip G. Perry, Webster, all of N.Y.

[73] Assignee: Xerox Corporation, Stamford, Conn.

[21] Appl. No.: 179,375

[22] Filed: Apr. 8, 1988

[51] Int. Cl.$^4$ .................. G03G 5/082; C21D 1/00

[52] U.S. Cl. .................. 430/128; 430/135; 148/126.1; 420/579; 427/76; 75/0.5 B

[58] Field of Search .......... 430/128, 135; 420/579; 427/76; 148/0.5 B, 126.1

[56] References Cited

U.S. PATENT DOCUMENTS

| | | | |
|---|---|---|---|
| 3,524,745 | 8/1970 | Cerlon et al. | 252/501.1 X |
| 3,785,806 | 1/1974 | Henrikson | 430/85 X |
| 4,015,029 | 3/1977 | Elchisak | 427/76 X |
| 4,097,267 | 6/1978 | Baccaro et al. | 75/0.5 B |
| 4,205,098 | 5/1980 | Kobayashi et al. | 427/76 |
| 4,297,424 | 10/1981 | Hewitt | 430/58 |
| 4,414,179 | 11/1983 | Robinette | 420/579 |
| 4,484,945 | 11/1984 | Badesha et al. | 75/0.5 A |
| 4,554,230 | 11/1985 | Foley et al. | 430/58 |
| 4,583,608 | 4/1986 | Field et al. | 148/1 |
| 4,585,621 | 4/1986 | Oda et al. | 420/579 |
| 4,609,605 | 9/1986 | Lees et al. | 430/58 |
| 4,632,849 | 12/1986 | Ogawa et al. | 427/248.1 X |
| 4,710,442 | 12/1987 | Koelling et al. | 430/85 |
| 4,770,965 | 9/1988 | Fender et al. | 430/66 |

*Primary Examiner*—Roland E. Martin

[57] ABSTRACT

An alloy treatment process is disclosed which comprises providing particles of an alloy comprising amorphous selenium and an alloying component selected from the group consisting of tellurium, arsenic, and mixtures thereof, the particles having an average particle size of at least about 300 micrometers and an average weight of less than about 1000 mg, forming crystalline nuclei on at least the surface of the particles while maintaining the substantial surface integrity of the particles, heating the particles to an initial temperature between about 50° C. and about 80° C. for at least about 30 minutes to form a thin, substantially continuous layer of crystalline material on the surface of the particles while maintaining the core of selenium alloy in the particles in an amorphous state, and rapidly heating the particles to at least a second temperature below the softening temperature of the particles that is at least 20° C. higher than the initial temperature and between about 85° C. and about 130° C. to crystallize about 5 to 100 percent by weight of the amorphous core of selenium alloy in the particles while maintaining the integrity of the alloy particles and inhibiting the loss of selenium rich material. The resulting crystallized particles in shot or pellet form may be rapidly heated in a vacuum chamber to vacuum deposit the alloy onto a substrate.

19 Claims, No Drawings

REDUCTION OF SELENIUM ALLOY FRACTIONATION

BACKGROUND OF THE INVENTION

The present invention relates in general to treatment of selenium alloy particles prior to vapor deposition of the selenium alloy on a substrate and of using the treated selenium alloy particles in a process to vapor deposit a selenium alloy layer onto a substrate for electrophotographic imaging members.

The formation and development of images on the imaging surfaces of electrophotographic imaging members by electrostatic means is well known. One of the most widely used processes being xerography described, for example, in U.S. Pat. No. 2,297,691 to Chester Carlson. Numerous different types of electrophotographic imaging members for xerography, i.e. photoreceptors, can be used in the electrophotographic imaging process. Such electrophotographic imaging members may include inorganic materials, organic materials, and mixtures thereof. Electrophotographic imaging members may comprise contiguous layers in which at least one of the layers performs a charge generation function and another layer forms a charge carrier transport function or may comprise a single layer which performs both the generation and transport functions. These electrophotographic imaging members may be coated with a protective overcoating to improve wear.

Electrophotographic imaging members based on amorphous selenium have been modified to improve panchromatic response, increase speed and to improve color copyability. These devices are typically based on alloys of selenium with tellurium and/or arsenic. The selenium electrophotographic imaging members may be fabricated as single layer devices comprising a selenium-tellurium, selenium-arsenic or selenium-tellurium-arsenic alloy layer which performs both charge generation and charge transport functions. The selenium electrophotographic imaging members may also comprise multiple layers such as, for example, a selenium alloy transport layer and a contiguous selenium alloy generator layer.

A common technique for manufacturing photoreceptor plates involves vacuum deposition of a selenium alloy to form an electrophotographic imaging layer on a substrate. Tellurium is incorporated as an additive for the purpose of enhancing the spectral sensitivity of the photoconductor. Arsenic is incorporated as an additive for the purpose of improving wear characteristics, passivating against crystallization and improving electricals. Typically, the tellurium addition is incorporated as a thin selenium-tellurium alloy layer deposited over a selenium alloy base layer in order to achieve the benefits of the photogeneration characteristics of SeTe with the beneficial transport characteristics of SeAs alloys. Fractionation of the tellurium and/or arsenic composition during evaporation results in a concentration gradient in the deposited selenium alloy layer during vacuum evaporation. Thus, the term "fractionation" is used to describe inhomogeneities in the stoichiometry of vacuum deposited alloy thin films. Fractionation occurs as a result of differences in the partial vapor pressure of the molecular species present over the solid and liquid phases of binary, ternary and other multicomponent alloys. Alloy fractionation is a generic problem with chalcogenide alloys. A key element in the fabrication of doped photoreceptors is the control of fractionation of alloy components such as tellurium and/or arsenic during the evaporation of selenium alloy layers. Tellurium and/or arsenic fractionation control is particularly important because the local tellurium and/or arsenic concentration at the extreme top surface of the structure, denoted as top surface tellurium (TST) or top surface arsenic (TSA), directly affects xerographic sensitivity, charge acceptance, dark discharge, copy quality, photoreceptor wear and crystallization resistance. In single layer low arsenic selenium alloy photoreceptors, arsenic enrichment at the top surface due to fractionation can also cause severe reticulation of the evaporated film. In two layer or multilayer photoreceptors where low arsenic alloys may be incorporated as a base or transport layer, arsenic enrichment at the interface with the layer above can lead to severe residual cycle up problems. In single layer tellurium selenium alloy photoreceptors, tellurium enrichment at the top surface due to fractionation can cause undue sensitivity enhancement, poor charge acceptance and enhancement of dark discharge. In two layer or multilayer photoreceptors where tellurium alloys may be incorporated as a generator layer, tellurium enrichment at the upper surface of the tellurium alloy layer can result in similar undue sensitivity enhancement, poor charge acceptance, and enhancement of dark discharge.

One method of preparing selenium alloys for evaporation is to grind selenium alloy shot (beads) and compress the ground material into pellet agglomerates, typically 150-300 mg. in weight and having an average diameter of about 6 millimeters (6,000 micrometers). The pellets are evaporated from crucibles in a vacuum coater using a time/temperature crucible designed to minimize the fractionation of the alloy during evaporation.

One shortcoming of a vacuum deposited selenium-tellurium alloy layer in a photoreceptor structure is the propensity of the selenium-tellurium alloy at the surface of the layer to crystallize under thermal exposure in machine service. To retard premature crystallization and extend photoreceptor life, the addition of up to about 5 percent arsenic to the selenium-tellurium alloy was found beneficial without impairment of xerographic performance. It was found that the addition of arsenic to the composition employed to prepare the pellet, impaired the capability of the process to control tellurium fractionation. Selenium-tellurium-arsenic pellets produced by the pelletizing process exhibited a wider variability of top surface tellurium concentrations compared to selenium-tellurium pellets. This wider variability of top surface tellurium concentrations was manifested by a correspondingly wider distribution of photoreceptor sensitivity values than the top surface tellurium concentration variations in the selenium-tellurium alloy pellets. In an extended photoreceptor fabrication run, up to 50 percent of the selenium-tellurium-arsenic pellets were rejected for forming high top surface tellurium concentrations which caused excessive sensitivity in the final photoreceptor.

In deposited layers of alloys of Se-Te, the normal percentage of top surface tellurium can cause excessively high photosensitivity. This photosensitivity is variable and changes as the surface of the layer wears away. Surface injection of corona deposited charge and thermally enhanced bulk dark decay involving carrier generation cause the toner images in the final copies to exhibit a washed out, low density appearance. Excessive dark decay causes loss of high density in solid areas of toner images and general loss of image density.

In three layered photoreceptors containing, for example, a base layer of selenium doped with arsenic and chlorine, a generator layer of selenium doped with tellurium and a top layer of selenium doped with arsenic, there is a susceptibility to changes in the Te concentration profile through the thickness of the SeTe alloy layer due to Te diffusion. The diffusion rate is a function of the concentration of Te. Higher concentrations of Te diffuse at a higher rate. Such diffusion causes changes in the electrical properties as the concentration of Te changes. The diffusion occurs from the middle layer into the adjacent layers. Diffusion is a greater problem in alloys of Se-Te compared to alloys of Se-Te-As because some cross-linking occurs in the latter alloy.

For alloys of Se-As, a sufficiently high concentration of top surface arsenic causes reticulation of the surface of the deposited alloy layer. This occurs as the deposited surface cools down and the differential thermal contraction through the thickness of the layer causes the surface to wrinkle. The deposited layer also exhibits electrical instability with excessive dark decay under certain conditions. When the photoreceptor comprises a single layer Se-As alloy, about 1 to about 2.5 percent by weight arsenic, based on the weight of the entire layer, at the surface of an alloy layer provides protection against surface crystallization. When the concentration of arsenic is greater than about 2.5 percent by weight, reticulation or electrical instability risks become higher. However, the shift in photosensitivity is not large.

In the past, shutters have been used over crucibles to control fractionation. These shutters are closed near the end of the evaporation cycle. The tellurium or arsenic rich material arising from the crucible deposits on the shutter rather than on the photoreceptor. However, in planetary coating systems, installation of shutters is complex, difficult and expensive. Further, after one or more coating runs, it is necessary to clean the surface of the shutters and the resulting debris can cause defects to occur in subsequently formed photoreceptor layers.

Thus, a significant problem encountered in the fabrication of selenium alloy photoreceptors is the fractionation of preferential evaporation of a species such that the resulting film composition does not replicate the original composition. In other words, the deposited film or layer does not have a uniform composition extending from one surface to the other. For example, when tellurium is the dopant, the tellurium concentration is unduly high at the top surface and approaches zero at the bottom of the vacuum deposited layer. This problem is also observed for alloys of Se-Te, Se-As, Se-As-Te, Se-As-Te-Cl, and the like and mixtures thereof.

PRIOR ART STATEMENT

Copending U.S. Patent Application Ser. No. 946,238, to W. Fender et al, filed Dec. 23, 1986—A process is described which includes heating an alloy comprising selenium and from about 0.05 percent to about 2 percent by weight arsenic until from about 2 percent to about 90 percent by weight of the selenium in the alloy is crystallized, vacuum depositing the alloy on a substrate to form a vitreous micrometers and about 400 micrometers containing between about 0.3 photoconductive insulating layer having a thickness of between about 100 percent and about 2 percent by weight arsenic at the surface of the photoconductive insulating layer facing away from the conductive substrate, and heating the photoconductive insulating layer until only the selenium in the layer adjacent the substrate crystallizes to form a continuous substantially uniform crystalline layer having a thickness up to about one micrometer. A thin protective overcoating layer is applied on the photoconductive insulating layer. The selenium-arsenic alloy may be at least partially crystallized by placing the selenium alloy in shot form in a crucible in a vacuum coater and heating to between about 93° C. (200° F.) and about 177° C. (350° F.) for between about 20 minutes and about one hour to increase crystallinity and avoid reticulation. Preferably, the selenium-arsenic alloy material in shot form is heated until from about 2 percent to about 90 percent by weight of the selenium in the alloy is crystallized. The selenium-arsenic alloy material shot may be crystallized completely prior to vacuum deposition to ensure that a uniform starting point is employed. However, if desired, a completely amorphous alloy may be used as the starting material for vacuum deposition. In Examples II and V of this copending patent application, halogen doped selenium-arsenic alloy shot contained about 0.35 percent by weight arsenic, about 11.5 parts per million by weight chlorine, and the remainder selenium, based on the total weight of the alloy was heat aged at 121° C. (250° F.) for 1 hour in crucibles in a vacuum coater to crystallize the selenium in the alloy. After crystallization, the selenium alloy was evaporated from chrome coated stainless steel crucibles at an evaporation temperature of between about 204° C.(400° F.) and about 288° C.(550° F.).

Copending U.S. application Ser. No. 935,907, to M. Hordon et al, filed Nov. 28, 1986—A process is described in which the surfaces of large particles of an alloy comprising selenium, tellurium and arsenic, the particles having an average particle size of at least 300 micrometers and an average weight of less than about 1000 mg, are mechanically abraded while maintaining the substantial surface integrity of the large particles to form between about 3 percent by weight to about 20 percent by weight dust particles of the alloy based on the total weight of the alloy prior to mechanical abrasion. The alloy dust particles are substantially uniformly compacted around the outer periphery of the large particles of the alloy. The large particles of the alloy may be beads of the alloy having an average particle size of between about 300 micrometers and about 3,000 micrometers or pellets having an average weight between about 50 mg and about 1000 mg, the pellets comprising compressed finely ground particles of the alloy having an average particle size of less than about .200 micrometers prior to compression. In one preferred embodiment, the process comprises mechanically abrading the surfaces of beads of an alloy comprising selenium, tellurium and arsenic having an average particle size of between about 300 micrometers and about 3,000 micrometers while maintaining the substantial surface integrity of the beads to form a minor amount of dust particles of the alloy, grinding the beads and the dust particles to form finely ground particles of the alloy, and compressing the ground particles into pellets having an average weight between about 50 mg and about 1000 mg. In another embodiment, mechanical abrasion of the surface of the pellets after the pelletizing step may be substituted for mechanical abrasion of the beads. The process includes providing beads of an alloy comprising selenium, tellurium and arsenic having an average particle size of between about 300 micrometers and about 3,000 micrometers, grinding the beads to form finely ground particles of the alloy having an average particle size of less than about 200 micrometers, compressing the ground particles into pellets having an average weight between about 50 mg and about 1000 mg, and mechanically abrading the surface of the pellets to form alloy dust particles while maintaining the substantial surface integrity of the pellets. If desired, the process may include both the steps of mechanically abrading the surface of the beads and mechanically abrading the surface of the pellets. The selenium-tellurium-arsenic alloy in the pellets may then be vacuum deposited to form a photoconductive layer of an electrphotographic imaging member which comprises a substrate and, optionally, one or more other layers.

U.S. Pat. No. 4,205,098 to Kobayashi et al, issued May 27, 1980,—A process is disclosed in which a powdery material of selenium alone or at least with one additive is compacted under pressure to produce tablets, the tablets being degassed by heating the tablets at an elevated temperature below the melting point of the metallic selenium and thereafter using the tablets as a source for vacuum deposition. The tablets formed by compacting the powdery selenium under pressure may be sintered at a temperature between about 100° C. and about 220° C. Typical examples of sintering conditions include 210° C. for between about 20 minutes and about 1 hour and about 1 to 4 hours at 100° C. depending upon compression pressure. Additives mentioned include Te, As, Sb, Bi, Fe, Tl, S, I, F, Cl, Br, B, Ge, PbSe, CuO, Cd, Pb, $BiCl_3$, $SbS_3$, $Bi_2$, $S_3$, Zn, $CdS_2$, SeS and the like. In one example, tablets ahving a thickness of 2mm and a diameter of 6mm were sintered and degassed at about 210° C. for about 18 minutes.

U.S. Pat. No. 4,609,605 to Lees et al, issued Sept. 2, 1986—A multilayered electrophotographic imaging member is disclosed in which one of the layers may comprise a selenium-tellurium-arsenic alloy. The alloy can be prepared by grinding selenium-tellurium-arsenic alloy beads, with or without halogen doping, preparing pellets having an average diameter of about 6 mm from the ground material, and evaporating the pellets in crucibles in a vacuum coater.

U.S. Pat. No. 4,297,424 to Hewitt, issued Oct. 27, 1981—A process is disclosed for preparing a photoreceptor wherein selenium-tellurium-arsenic alloy shot is ground, formed into pellets and vacuum evaporated.

U.S. Pat. No. 4,554,230 to Foley et al, issued Nov. 19, 1985—A method is disclosed for fabricating a photoreceptor wherein selenium-arsenic alloy beads are ground, formed into pellets and vacuum evaporated.

In U.S. Pat. No. 4,205,098 to Kobayashi et al, issued May, 27, 1980—A method for producing selenium pellets is disclosed wherein selenium or selenium and additives are formed into powder and then compacted into pellets and vacuum evaporated. The additives may include tellurium and arsenic.

U.S. Pat. No. 3,524,754 to Cerlon et al, issued Aug. 18, 1970—A process is disclosed for preparing a photoreceptor wherein selenium-arsenic-antimony alloys are ground into fine particles and vacuum evaporated.

U.S. Pat. No. 4,710,442 to Koelling et al, issued Dec. 1, 1987—A arsenic-selenium photoreceptor is disclosed wherein the concentration of arsenic increases from the bottom surface to the top surface of the photoreceptor such that the arsenic concentration is about 5 weight percent at a depth about 5 to 10 microns on the top surface of the photoreceptor and is about 30 to 40 weight percent at the top surface of the photoreceptor. The photoreceptor is prepared by heating a mixture of selenium-arsenic alloys in a vacuum in a step-wise manner such that the alloys are consequentially deposited on the substrate to form a photoconductive film with an increasing concentration of arsenic from the substrate interface to the top surface of the photoreceptor. In one specific embodiment, a mixture of 3 selenium-arsenic alloys are maintained at an intermediate temperature in the range of from about 100° to 130° C. for a period of time sufficient to dry the mixture. The alloy may also contain a halogen. In Example X, the drying step temperature was attained in about 2 minutes and maintained for a period of approximately 3 minutes.

U.S. Pat. No. 4,583,608 to Field et al, issued Apr. 22, 1986—Heat treatment of single crystal superalloy particles are described. In one embodiment, single crystal particles are heat treated by using a heat treatment cycle during the initial stages of which incipient melting occurs within the particles being treated. During a subsequent step in heat treatment process substantial diffusion occurs in the particle. In a related embodiment, single crystal articles which have previously undergone incipient melting during a heat treatment process are prepared by a heat treatment process. In still another embodiment, a single crystal composition of various elements including chromium and nickel is treated to heating steps at various temperatures. In column 3, lines 40-47, a stepped treatment cycle is employed in which an alloy is heated to a temperature below about 25° F. of an incipient melting temperature and held below the incipient melting temperature for a period of time sufficient to achieve a substantial amount of alloy homogenization.

U.S. Pat. No. 4,585,621 to Oda et al, issued Apr. 29, 1986—Various selenium alloys, e.g., Se-Te and Se-As, containing phosphorous are vacuum deposited on a substrate to form a photoreceptor.

U.S. Pat. No. 4,632,849 to Ogawa et al, issued Dec. 30, 1986—A method for making a fine powder of a metallic compound coated with ceramics is described. The process involves heating a gaseous mixture of at least methyl vapor and another element to a temperature not higher than 0.8 times as low as the melting point of the metal so that the metal and other element are reactive with each other while rapidly cooling to form a fine powder metallic compound. The metallic powder is further passed into another metal vapor to cover the metal powder with the other metal. The reaction system is cooled to a region in which the metal compound is kept stable to prevent further growth of the particles.

Swiss Patent Publication No. CH-656-486-A, published June 30, 1986—PbTe, PbSn, PbSnTe, ZnTe, CdTe and CdHgTe are prod epitaxy, the solvent for the telluride being a melt of arsenic telluride and/or antimony telluride.

Japanese Patent Publication No. J6 0172-346-A, published Sept. 5, 1985—TlSe are placed in a crucible and heated at 180°-190° C., Mg is added to the melting alloy, the temperature is raised to the 200°-220° C. and allowed to stand at this temperature to form a uniform alloy of TlMgSe. The alloy is used in electric field-releasing ion beam generators.

U.S. Pat. No. 4,484,945 to Badesha et al, issued Nov. 27, 1984—A process is disclosed for preparing chalcogenide alloys by providing a solution mixture of oxides of the desired chalcogens and subsequently subjecting this mixture to a simultaneous co-reduction reaction. Generally the reduction reaction is accomplished at relatively low temperature, not exceeding about 120° C.

Japanese Patent Publication No. 57-1567 to Tokyo Shibaura Denki K.K., published June 7, 1982—An amorphous photoconductive material is obtained by combining selenium, arsenic, antimony and tellurium. This raises the glass transition point.

U.S. Pat. No. 4,414,179 to Robinette, issued Nov. 8, 1983—A process is disclosed for preparing a selenium alloy comprising heating a mixture comprising selenium, arsenic and chlorine to a temperature between about 290° C. and about 330° C. to form a molten mixture, agitating the molten mixture to combine the components, continuing all agitation, raising the temperature of the mixture to at least 420° C. for at least about 30 minutes and cooling the mixture until it becomes a solid. This alloy may be vacuum deposited.

U.S. Pat. No. 4,015,029 to Elchiasak, issued Mar. 29, 1977—A selenium alloy evaporation technique for depositing photoconductive material onto a substrate is described. The technique involves incorporating 1 to 80% by weight of at least one non-volatile infra red absorbing heat sink in or within the body of inorganic photoconductive material and thereafter heating the resulting mixture with infra red heat.

U.S. Pat. No. 3,785,806 to Henrickson, issued Jan. 15, 1974—A process is disclosed for producing arsenic doped selenium by mixing finely divided selenium with finely divided arsenic in an atomic ratio of 1:4 and thereafter heating the mixture in an inert atmosphere to obtain a master alloy. The master alloy is then mixed with molten pure selenium to attain an arsenic content of between 0.1 and 2% by weight based on the selenium.

Difficulties continue to be encountered in achieving precise control of tellurium and/or arsenic fractionation in the outer surface of a vacuum deposited photoconductive layer. This, in turn, affects the physical or electrical properties of the final photoreceptor. Photoreceptors containing large batch to batch top surface tellurium or arsenic concentrations tend to exhibit correspondingly large batch to batch variations in physical or electrical properties which is unacceptable in high speed precision copiers, duplicators and printers because of copy quality variations. Moreover, variations in physical or electrical properties as a photoreceptor surface wears away during cycling is unacceptable in high speed precision copiers, duplicators and printers particularly during long length runs where, for example, the copy quality should be uniform from the first copy to thousands of copies. Modern sophisticated, high speed copiers, duplicators and printers are constrained by narrow operating windows that require photoreceptors having precise, predictable operating characteristics from one batch to the next and during cycling. High temperature crystallization causes agglomeration of selenium alloy beads in and out of vacuum coaters. High temperature crystallization also results in loss of selenium rich material during the precrystallization step. This adversely affects effective control of fractionation during any precrystallization process. Crystallization of selenium alloys in a vacuum coater unduly affect productivity in a production environment. Furthermore, uniform crystallization temperatures in a coaster crucible may not be achieved. Temperature non uniformities for crystallization are likely to be undesirable. Also, it is doubtful that high levels of crystallization of many tens of percent can be obtained in less than one hour at constant crystallization temperatures of, for example, about 95° C.

Thus, there is a need for an improved process for preparing photoreceptors comprising selenium alloys containing additives such as tellurium and/or arsenic.

SUMMARY OF THE INVENTION

Accordingly, it is an object of the present invention to provide an improved process for preparing selenium alloy materials for electrophotographic imaging members which overcomes the the above-noted disadvantages.

It is a further object of the present invention to provide an improved process which forms free-flowing crystallization selenium alloy beads or pellets.

It is a further object of the present invention to provide an improved process which forms free-flowing crystallized selenium alloy beads or pellets substantially free of agglomerates.

It is a further object of the present invention to provide an improved process which forms free-flowing crystallized selenium alloy beads or pellets by a method which prevents coalescence of the crystallized material into a fused mass.

It is a further object of the present invention to provide an improved process which forms free-flowing crystallized selenium alloy beads or pellets which are substantially in their original physical form.

It is a further object of the present invention to provide an improved process which controls tellurium fractionation within narrower limits.

It is a further object of the present invention to provide an improved process which controls arsenic fractionation within narrower limits.

It is a further object of the present invention to provide an improved process which controls the sensitivity of photoreceptors to light within narrower limits.

It is a further object of the present invention to provide an improved process which increases photoreceptor fabrication yields.

It is a further object of the present invention to provide an improved process which reduces the level of tellurium fractionation.

It is a further object of the present invention to provide an improved process which reduces the level of arsenic fractionation.

It is a further object of the present invention to provide an improved process which reduces the tellurium distribution variation through the thickness of a selenium-tellurium alloy photoconductive layer.

It is a further object of the present invention to provide an improved process which reduces the arsenic distribution variation through the thickness of a selenium-arsenic alloy photoconductive layer.

It is a further object of the present invention to provide an improved process which controls the electrical cycling characteristics within narrower limits.

It is a further object of the present invention to provide an improved process which controls the mechanical wear characteristics of the photoreceptor surface within narrower limits.

It is a further object of the present invention to provide an improved process which limits the loss of selenium rich species early in the evaporation process.

It is a further object of the present invention to provide an improved process which allows the achievement of TSA and TST values within narrower predefined limits.

It is a further object of the present invention to provide an improved process which produces evaporated films of selenium and its alloys with arsenic and/or tellurium which have superior photoconductive properties.

It is a further object of the present invention to provide an improved process which produces photoconducting devices which provide improved image quality when used in electroxerographic applications.

The above objects and others are accomplished in accordance with the present invention by providing a selenium alloy treatment process comprising providing particles of an alloy comprising amorphous selenium and an alloying component selected from the group consisting of tellurium, arsenic, and mixtures thereof, the particles having an average particle size of at least about 300 micrometers and an average weight of less than about 1000 mg, forming crystal nuclei on at least the surface of the particles while maintaining the substantial surface integrity of the particles, heating the particles to an initial temperature between about 50° C. and and about 80° C. for at least about 30 minutes to form a thin, substantially continuous layer of crystalline material on the surface of the particles while maintaining the core of selenium alloy in the particles in an amorphous state, and rapidly heating the particles to a second temperature that is at least 20° C. higher than the initial temperature and between about 85° C. and about 130° C. to crystallize about 5 to 100 percent by weight of the amorphous core of selenium alloy in the particles while maintaining the integrity of the alloy particles and inhibiting the loss of selenium rich material. The resulting crystallized particles in shot or pellet form may be rapidly heated in a vacuum chamber to vacuum deposit the alloy onto a substrate.

The substrate may be opaque or substantially transparent and may comprise numerous suitable materials having the required mechanical properties. The entire substrate may comprise the same material as that in the electrically conductive surface or the electrically conductive surface may merely be a coating on the substrate. Any suitable electrically conductive material may be employed. Typical electrically conductive materials include, for example, aluminum, titanium, nickel, chromium, brass, stainless steel, cooper, zinc, silver, tin, and the like. The conductive layer may vary in thickness over substantially wide ranges depending on the desired use of the electrophotoconductive member. Accordingly, the conductive layer may generally range in thickness from about 50 Angstrom units to many centimeters. When a flexible electrophotographic imaging member is desired, the thickness may be between about 100 Angstrom units to about 750 Angstrom units. The substrate may be of any other conventional material including organic and inorganic materials. Typical substrate materials include insulating non-conducting materials such as various resins known for this purpose including polyesters, polycarbonates, polyamides, polyurethanes, and the like. The coated or uncoated substrate may be flexible or rigid and may have any number of configurations such as, for example, a plate, a cylindrical drum, a scroll, an endless flexible belt, and the like. The outer surface of the supporting substrate preferably comprises a metal oxide such as aluminum oxide, nickel oxide, titanium oxide, and the like.

In some cases, intermediate adhesive layers between the substrate and subsequently applied layers may be desirable to improve adhesion. If such adhesive layers are utilized, they preferably have a dry thickness between about 0.1 micrometers to about 5 micrometers. Typical adhesive layers include film-forming polymers such as polyester, polyvinylbutyrla, polyvinylpyrolidone, polycarbonate, polyurethane, polymethylmethacrylate, and the like and mixtures thereof. Since the surface of the supporting substrate may be a metal oxide layer or an adhesive layer, the expression "supporting substrate" as employed herein is intended to include a metal oxide layer with or without an adhesive layer on a metal oxide layer.

Any suitable photoconductive chalcogenide alloy including binary, tertiary, quaternary, and the like alloys may be employed to form the vacuum deposited photoconductive layer. Preferred alloys include alloys of selenium with tellurium, arsenic, or tellurium and arsenic with or without a halogen dopant. Typical photoconductive alloys of selenium include selenium-tellurium, selenium-arsenic, selenium-tellurium-arsenic, selenium-tellurium-chlorine, selenium-arsenic-chlorine, selenium-tellurium-arsenic-chlorine alloys, and the like. Photoconductive alloys of selenium are to be distinguished from stoichiometric compounds of selenium such as arsenic triselenide ($As_2Se_3$). Stoichiometric compounds of selenium such as arsenic triselenide appear to present less of a fractionation problem compared to alloys of selenium such as alloys of selenium and tellurium. As employed herein, a selenium alloy is defined as an intermetallic compound of selenium with other elemental additives where the ratios of constituents are inconsistent with stoichiometric compositions. The photoconductive alloys of selenium may be applied to a coated or uncoated substrate alone as the only photoconductive layer or it may be used in conjunction with one or more other layers such as a selenium or selenium alloy transport layer and/or a protective overcoat layer. Generally, the selenium-tellurium alloy may comprise between about 5 percent by weight and about 40 percent by weight tellurium and a halogen selected from the group consisting of up to about 70 parts per million by weight of chlorine and up to about 140 parts per million by weight of iodine all based on the total weight of the alloy with the remainder being selenium. The selenium-arsenic alloy may, for example, comprise between about 0.01 percent by weight and about 35 percent by weight arsenic and a halogen selected from the group consisting of up to about 200 parts per million by weight of chlorine and up to about 1000 parts per million by weight of iodine all based on the total weight of the alloy with the remainder being selenium. The selenium-tellurium-arsenic alloy may comprise between about 5 percent by weight and about 40 percent by weight tellurium, between about 0.1 percent by weight and about 5 percent by weight arsenic and a halogen selected from the group consisting of up to about 200 parts per million by weight of chlorine and up to about 1000 parts per million by weight of iodine all based on the total weight of the alloy with the remainder being selenium. The expressions "alloy of selenium" and "selenium alloy" are intended to include halogen doped alloys as well as alloys not doped with halogen. Surprisingly, analysis of films coated from pre-crystallized arsenic alloy particles indicated nominal chlorine levels in the vacuum deposited films, e.g., chlorine loss does not appear to be a factor in the pre-crystallization of low arsenic alloy beads. When employed as a single photoconductive layer in an electrophotographic imaging member, the thickness of the photoconductive selenium alloy layer is generally between about 0.1 micrometers and about 400 micrometers thick.

Selenium-tellurium and selenium-tellurium-arsenic alloy photoconductive layers are frequently employed as a charge generation layer in combination with a charge transport layer. The charge transport layer is usually positioned between a supporting substrate and the charge generating selenium alloy photoconductive layer. Generally, a selenium-tellurium alloy may comprise from about 60 percent by weight to about 95 percent by weight selenium and from about 5 percent by weight to about 40 percent by weight tellurium based on the total weight of the alloy. The selenium-tellurium alloy may also comprise other components such as less than about 35 percent by weight arsenic to minimize crystallization of the selenium and less than about 1000 parts per million by weight halogen. In a more preferred embodiment, the photoconductive charge generating selenium alloy layer comprises between about 5 percent by weight and about 25 percent by weight tellurium, between about 0.1 percent by weight and about 4 percent by weight arsenic, and a halogen selected from the group consisting of up to about 100 parts per million by weight of chlorine and up to about 300 parts per million by weight of iodine with the remainder being selenium. Compositions for optimum results are dictated by the application. It is desirable, in general, to achieve uniformly homogeneous compositions within the evaporated layers, i.e. to evaporate the alloy materials without significant fractionation. Elevated levels of tellurium lead to excessive photoreceptor light sensitivity and high dark decay and correspondingly reduced levels of tellurium result in low light sensitivity and loss of copy quality. Elevated levels of arsenic in some applications, above about 4 percent by weight, can lead to high dark decay, to problems in cycling stability and to reticulation of the photoreceptor surface. The resistance of amorphous selenium photoreceptors to thermal crystallization and surface wear begins to degrade as the concentration of arsenic drops below about 1 percent by weight. As the chlorine content rises above about 70 parts per million by weight chlorine, the photoreceptor begins to exhibit excessive dark decay.

Any suitable selenium alloy transport layer may be utilized as a transport layer underlying a photoconductive selenium alloy charge generating layer. The charge transport material may, for example, comprise pure selenium, selenium-arsenic alloys, selenium-arsenic-halogen alloys, selenium-halogen and the like. Preferably, the charge transport layer comprises a halogen doped selenium arsenic alloy. Generally, about 10 parts by weight per million to about 200 parts by weight per million of halogen is present in a halogen doped selenium charge transport layer. If a halogen doped transport layer free of arsenic is utilized, the halogen content should normally be less than about 20 parts by weight per million. Inclusion of high levels of halogen in a thick halogen doped selenium charge transport layer free of arsenic leads to excessive dark decay. Imaging members containing high levels of halogen in a thick halogen doped selenium charge transport layer free of arsenic are described, for example, in U.S. Pat. No. 3,635,705 to Ciuffini, U.S. Pat. No. 3,639,120 to Snelling, and Japanese Patent Publication No. J5 61 42-537 to Ricoh, published June 6, 1981. Generally, halogen doped selenium arsenic alloy charge transport layers comprise between about 99.5 percent by weight to about 99.9 percent by weight selenium, about 0.1 percent to about 0.5 percent by weight arsenic and between about 10 parts per million by weight to about 200 parts per million by weight of halogen, the latter halogen concentration being a nominal concentration. The expression "nominal halogen concentration" is defined as the halogen concentration in the alloy evaporated in the crucible. The thickness of the charge transport layer is generally between about 15 micrometers and about 300 micrometers and preferably from about 25 micrometers to about 50 micrometers because of constraints imposed by the xerographic development system, constraints imposed by carrier transport limitations and for reasons of economics. The expression "halogen materials" is intended to include fluorine, chlorine, bromine, and iodine. Chlorine is the preferred halogen because of the ease of handling and stability of chlorine in a vacuum deposited film (apparently due to lack of out diffusion). Transport layers are well known in the art. Typical transport layers are described, for example, in U.S. Pat. No. 4,609,605 to Lees et al and in U.S. Pat. No. 4,297,424 to Hewitt, the entire disclosures of these patents being incorporated herein by reference.

If desired, an interface layer may be positioned between the transport layer and the charge generating photoconductive layer. The interface layer material may, for example, consist essentially of selenium and a nominal halogen concentration of about 50 parts by weight per million to about 2,000 parts by weight per million halogen material with the remainder comprising selenium. Minor additions of arsenic might be added but are relatively undesirable and may require additional halogen to compensate for this arsenic addition. The halogen concentration in the deposited interface layer will typically be somewhat less than that in the alloy evaporated in the crucible. In order to achieve optimal device properties, the actual halogen content in any final interface layer should normally be greater than about 35 parts by weight per million. Inclusion of high levels of halogen in thick halogen doped selenium layers free of arsenic leads to excessive dark decay because dark decay is substantially a function of the total halogen in a multilayer imaging member. Imaging members containing high levels of halogen in a thick halogen doped selenium charge transport layer free of arsenic are described, for example, in U.S. Pat. No. 3,635,705 to Ciuffini, U.S. Pat. No. 3,639,120 to Snelling, and Japanese Patent Publication No. J5 61 42-537 to Ricoh, published June 6, 1981. The use of interface layers is described in U.S. Pat. No. 4,554,230 to Foley et al, the entire disclosure of which is incorporated herein by reference.

The particles treated by the process of this invention may in general be in either shot (bead) particle or pellet particle form. However the particles may also be in chunk or ingot form also if so desired. Generally, to prepare shot (bead) particles, the components of selenium alloys are combined by melting the selenium and additives together by any suitable conventional technique. The molten selenium alloy is then shotted by any suitable method. Shotting is usually effected by quenching molten droplets of the alloy in a coolant such as water to form large particles of alloy in the form of shot or beads. Shotting processes for forming alloy beads are well known and described, for example, in U.S. Pat. No. 4,414,179 to S. Robinette, the entire disclosure of this patent being incorporated herein by reference. The alloy beads may have an average size of, for example, between about 300 micrometers and about 3,000 micrometers. Pellet particles may be prepared from shot particles by grinding shot particles into a powder and thereafter compressing the powder into relatively large pellets. Pelletizing of the amorphous shotted alloy is frequently utilized as a means of controlling fractionation. Pelletizing however, is a costly and labor intensive process and therefore precrystallization of the alloy shot as a fractionation control scheme is to be preferred over crystallization of the alloy pellets. In other words, the vacuum deposited layer may be formed directly from shot rather than from pellets. Moreover, omission of pelletizing steps minimizes the likelihood of contamination of the alloy by foreign material. However, if desired, the pellet form of the alloy may be used. The free flowing shot or pellets obtained by the multistep process of this invention can be readily weighed out and spread evenly in the crucibles to facilitate more uniform melting of the alloy and evaporation without splattering do to trapped gasses. Material in "chunk" or agglomerated form would not be suitable because of handling, and weighing difficulties and difficulty in distributing the material evenly within the crucibles within the vacuum coater.

Where pellets are to be employed, the alloy beads, or combination of the alloy beads and minor amount of dust particles formed if vigorous mechanical abrasion of the alloy beads is employed, is thereafter rapidly ground in a conventional high speed grinder or attritor to form alloy particles having an average particle size of less than about 200 micrometers. Any suitable grinding device may be utilized to pulverize the bead particles to form the fine alloy particles having an average particle size of less than about 200 micrometers. Typical grinders include hammer mills, jet pulverizers, disk mills, and the like. Depending upon the efficiency of the grinding device employed, grinding alloy beads to form alloy particles having an average particle size of less than about 200 micrometers can normally be accomplished in less than about 5 minutes. Longer grinding times may be employed, if desired.

After grinding, the fine alloy particles having an average particle size of less than about 200 micrometers are compressed by any suitable technique into large particles of alloy usually referred to as pellets having an average weight between about 50 mg and about 1000 mg. A pellet weight greater than about 50 mg is preferred for ease of handling. When the pellet weight exceeds about 1000 mg, evaporation discontinuities are observed. The pellets may be of any suitable shape. Typical shapes include cylinders, spheres, cubes, tablets, and the like. Compression of the alloy particles into pellets may be accomplished with any suitable device such as, fro example, a simple punch tableting press, a multi punch rotary tableting press, and the like.

The selenium alloy shot or pellet particles may be subjected to a variety of treatments to produce suitable surface crystallization. This surface crystallization is a necessary prerequisite to the bulk precrystallization step. The surface crystallization which is produced at low temperatures allows subsequent bulk precrystallization to occur at higher temperatures without the usual agglomeration of the alloy particles. Nucleation and growth of crystallites on the surface of the alloy particles can be induced by a variety of techniques including low temperature thermal treatment of material whose outer surface has been mechanically abraded, low temperature thermal treatment during exposure to ultraviolet radiation, electron beam irradiation, gamma ray irradiation, xradiation, and exposure to solvents and chemical vapors. The thermal treatment of abraded alloy particles is the preferred method of inducing this surface crystallization.

A suitable abrasion technique is described in copending U.S. application Ser. No. 935,907, to M. Hordon et al, filed Nov. 28, 1986, the entire disclosure of which is incorporated herein by reference. Abrasion can be carried out by merely tumbling the shot or pellet particles together in a suitable device such as a roll mill. The alloy beads may, in one embodiment, be mechanically abraded while maintaining the substantial surface integrity of the beads to form a minor amount of dust particles from the alloy beads. This "minor amount" of alloy dust particles generally comprises between about 3 percent by weight to about 20 percent by weight of the total weight of the alloy prior to mechanical abrasion. Generally, alloy dust particles are created by imparting a vigorous tumbling action to the bead particles. Although the bead particles impact each other and against the mechanical device that imparts the tumbling or other suitable abrasive movement to the particles, the abrasive action should be sufficient to create dust particles having an average particle size of less than about 10 micrometers while avoiding any substantial crushing of the bead particles. More specifically, substantial surface integrity (i.e. bead shape) of the beads is maintained when less than about 20 percent by weight of the alloy beads, based on the weight of the total alloy, is fractured during the period when the beads are mechanically abraded to form the alloy dust. In other words, although the surface of the beads may be pitted and nicked, the overall bead shape is substantially conserved for at least about 80 percent by weight of the alloy beads. The time that the alloy beads should be mechanically abraded depends upon numerous factors such as the size of the alloy bead batch, the type of device employed to impart mechanical abrasion to the beads, the amount of crystal nucleation sites desired, and the like. The abrasion time should be sufficient to generate significant levels of nucleation sites at the particle surface while maintaining the substantial surface integrity of the bead particles. The alloy dust particles adhere to the surface of the bead particles much like toner particles adhere to the surface of carrier particles in two component electrophotographic developer mixtures and are substantially uniformly compacted around the outer periphery of bead particles. Any suitable device may be utilized to mechanically abrade the alloy beads and form the alloy dust particles. Typical devices for mechanically abrading particles by tumbling include vaned roll blenders, vibrating tubs, conical screw mixers, V-shaped twin shell mixers, double-cone blenders, and the like.

Where it is desired to surface crystallize alloy pellets the abrasion step may be omitted, the grinding and pelletizing processes generating sufficient levels of nucleation sites that subsequent surface crystallization is readily achieved.

After forming crystal nuclei on at least the surface of the particles, pre-crystallization of the selenium alloy to form at least a thin, substantially continuous layer of crystalline material covering the outer surface of the selenium alloy particles must be carried out by heating at low temperatures. As employed herein, the expression "thin, substantially continuous layer of selenium crystals" is defined as a layer of crystalline material whose surface area coverage of the alloy particle exceeds about 80 percent and more preferably approaches 100 percent. Precrystallization of the alloy surface may be determined by any suitable technique. Typical techniques for detecting selenium crystallization include x-ray diffraction, electron diffraction and the like. Heating may be effected, for example, with any suitable device such as an oven.

In the process of this invention, it has been found that surface pre-crystallization of shot or pellets effected at low temperatures far below the softening point of the alloy followed by further bulk crystallization at relatively higher temperature effectively controls fractionation of selenium arsenic alloys, selenium tellurium alloys and selenium tellurium arsenic alloys with or without halogen dopants and avoids any significant agglomeration of shot or pellets. The temperature to initiate surface crystallization is dependent on the specific alloy and is bounded on the low temperature side by the need to crystallize material in a reasonable time from a production standpoint, and on the upper temperature side by a need to prevent softening and subsequent agglomeration of the alloy particles. Free flowing crystallized selenium alloy particles greatly facilitate handling, weighing, and the like prior to the final vacuum deposition step and are particularly important in attaining uniform distribution of alloy particles in evaporation crucibles. Any suitable low temperature thermal treatment technique may be utilized to achieve surface pre-crystallization of shot or pellets. The temperature and time employed should be sufficient to form a thin, substantially continuous crystalline layer that surrounds an amorphous core of selenium alloy material. Generally, the particles should be heated to a temperature between about 50° C. and about 80° C. far below the softening temperature of the particles until at least a thin, substantially continuous layer of crystalline material is formed at the surface of said particles and the core of selenium alloy in the particles remains in an amorphous state. The softening temperature for any given alloy may be determined experimentally by conducting constant temperature runs at incrementally increased temperatures for different batches until the shot or beads in a given batch begin to agglomerate during the thermal treatment. Such major agglomeration is to be avoided in the process of this invention, although some slight agglomeration involving only a few beads can be tolerated. Typical pre-crystallization techniques include subjecting each surface of shot or pellets to temperatures of between about 50° C. and about 80° C. for between about 30 minutes and about 8 hours for a selenium alloy comprising between about 0.3 and 2 percent by weight arsenic, between about 5 and about 15 percent by weight tellurium and the remainder selenium. For example, a thin, substantially continuous layer of crystalline material was formed at the surface of abraded alloy shot comprising about 0.5 percent As, about 12 ppm chlorine and the remainder Se by heating the shot at about 60° C. for about 3 hours. Aging of shot material over long periods of time at either room temperature or temperatures well below the softening temperature of the alloy will ultimately lead to complete crystallization of the material but would require very long process times and consequently a high volume of "in process" material. For example, the abraded alloy shot comprising about 0.5 percent As, about 12 ppm chlorine and the remainder Se described above required many weeks of heating at about 60° C. to achieve complete crystallization. Heating at high temperature near the softening temperature of selenium alloy shot or pellets to crystallize the selenium therein, results in the formation of agglomerates or "chunks" that greatly interfere with the proper handling, weighing and the like of shot or pellets prior to the final vacuum deposition step. Thus, an important purpose of the low temperature pre-crystallization heat treatment is to create essentially complete crystallization of a thin, continuous layer at the outer surface of the alloy beads or pellets sufficient to prevent agglomeration during the subsequent final crystallization step conducted at higher temperatures.

In copending U.S. patent application Ser. No. 946,238, filed in the name of W. Fender et al on Dec. 23, 1986, a process is described in which selenium-arsenic alloy may be at least partially crystallized by placing the selenium alloy in shot form in a crucible in a vacuum coater and heated to between about 93° C.(200° F.) and about 177° C. (350° F.) for between about 20 minutes and about one hour to increase crystallinity and avoid reticulation. The selenium-arsenic alloy material in shot form is preferably heated until from about 2 percent to about 90 percent by weight of the selenium in the alloy is crystallized. This selenium-arsenic alloy material shot may be crystallized completely prior to vacuum deposition to ensure that a uniform starting point is employed. The crystallization of shot using heat at relatively high temperatures, as described in U.S. Patent Application Ser. No. 946,238, can cause agglomeration of the shot particles which renders the shot particles difficult to handle, weigh and the like during processing prior to introduction in a vacuum coater. The disclosure of Application Ser. No. 946,238 does not pertain to a multistep process involving a nucleation step, a surface precrystallization step (steps designed to allow higher temperature bulk precrystallization without agglomeration of the alloy beads), and a bulk precrystallization step. The use of a vacuum coater to crystallize alloy particles in the process of Application Ser. No. 946,238 ties up the vacuum coater for long periods of time and represents a major reduction in photoreceptor productivity. Also, it is unlikely that very uniform precrystallization temperatures can be obtained in a coater crucible. Undesirable crystallization non uniformities are likely to result. Moreover, it is doubtful that the desired levels of crystallization of many tens of percent can be obtained in one hour at the lower end of the crystallization temperature range (approx. 95° C.) without the pretreatment of the alloy beads.

After the initial low temperature thermal, pre-crystallization treatment, the treatment of the shot or pellets is rapidly raised in a final bulk crystallization treatment to at least a second temperature which is below the softening temperature of the particles and which is at least about 20° C. higher than the initial low temperature thermal, pre-crystallization treatment and which lies between about 85° C. and about 130° C. to crystallize at least about 5 percent by weight of the amorphous core of selenium alloy in the particles. Crystallization of 100 percent of the amorphous core of selenium alloy in the particles is preferred for optimum control of fractionation. A typical heating temperature for the final, second crystallization step for selenium alloys containing about 0.5 percent by weight arsenic, based on the total weight of the alloy, is, for example, between about 90° C. and 100° C. A typical heating temperature for selenium alloys containing about 10 percent by weight tellurium, based on the total weight of the alloy, is, for example, between about 95° C. and 105° C. For example, the precrystallized alloy shot described above comprising about 0.5 percent As, about 12 ppm chlorine and the remainder Se that was abraded in a Munson Abrader and thereafter heated at about 60° C. for about 3 hours to form a substantially continuous surface crystalline layer, may be completely and rapidly crystallized by ramping the temperature to a much higher temperature, e.g. in the 90°-100° C. range for about 3 hours. The alloy beads did not fuse together during the pre-crystallization temperatures and rapidly become 100 percent crystallized while keeping their integrity as separate beads. In contrast, the heating of alloy beads having an identical composition that were not subjected to a pre-crystallization treatment quickly fused together into a solid mass at 90° C.-100° C. and were no longer in a form that was conveniently usable for vacuum evaporation. The process taught in U.S. patent application Ser. No. 946,238 would thus work acceptably from a material handling viewpoint where crystallization takes place within the vacuum coater, but would be unacceptable where material is prepared at these temperatures outside the coater, the material agglomerating and becoming difficult to handle. The acceptable temperature range for final crystallization, 85° C.-b 130° C., is determined by the partial vapor pressure of each of the vapor species over the solid at the temperature of interest. The temperature for final crystallization should be such that there is no significant loss of selenium rich species i.e. species whose composition corresponds to a selenium level considerably higher than that represented by the nominal composition within the starting alloy. Loss of selenium rich species contributes significantly to the fractionation problem. The high temperature final crystallization treatment is generally conducted for about 10 hours or less depending upon the degree of crystallization desired. Generally, a high temperature treatment of between about 2 hours to about 10 hours may be employed for temperatures between about 85° C. and and about 130° C.

Shot (beads) or pellets that are 100 percent crystallized are preferred for optimum control of fractionation. Where higher manufacturing throughput is desired, some reduction of the degree of crystallization can be tolerated. For example, the degree of crystallization may, if desired, be reduced to about 5 percent for arsenic or tellurium. The degree of crystallization of selenium alloy shot, beads or pellets can be readily determined by X-Ray diffraction spectra. As indicated above, the treatment process of this invention prevents agglomeration and allows the selenium alloy particles to readily be processed, weighed, distributed evenly within the coater crucibles and the like prior to the final heating step to evaporate the alloy during vacuum deposition.

The pre-crystallization and final crystallization treatments may be effected well in advance of vacuum deposition of the alloy onto a substrate. If desired, intermediate heating steps may be employed between the pre-crystallization and final crystallization treatments. However, such intermediate heating steps are generally unnecessary.

If desired, the crystallized selenium alloy shot or pellets of this invention may be mixed with amorphous selenium alloy shot or pellets to form the crucible load for vacuum evaporation onto a substrate. Blends of up to about 75 percent by weight amorphous selenium alloy shot or pellets, based on the total weight of the blend, may be formed with the crystallized selenium alloy shot or pellets formed by the temperature process of this invention. Depending upon the relative amount of amorphous selenium alloy shot or pellets present, much of the advantageous properties crystallized selenium alloy shot or pellets formed by the treatment process of this invention are imparted to these blends. For example, greater fractionation control may be attained with these blends compared to loads of 100 percent amorphous selenium alloy shot or pellets. Generally, blends containing greater than about 75 percent by weight amorphous selenium alloy shot or pellets tend, for example, to form vacuum deposited selenium alloy layers having top surface arsenic concentrations greater than about 1.5 percent by weight with nominal starting alloy compositions containing between about 0.25 to about 0.5 percent by weight arsenic. By using blends of crystalline and amorphous materials, process and handling costs are reduced proportionately.

The coating process of this invention varies depending upon the different pre-crystallized materials utilized. Moreover, where the selenium alloy deposited is the only photoconductive layer in the final photoreceptor, the selenium alloy may be vacuum deposited in a conventional manner except that the temperature profile used rapidly ramps from a low temperature to a higher temperature, with final evaporation preferably being conducted as quickly as possible without splattering. Splattering causes surface defects. Pre-crystallization also eliminates much of the volatile and gaseous material trapped in the alloy beads and, therefore, reduces the tendency to splatter due to sudden release of gas during bead or pellet melt down. Steep temperature ramping prevents selenium rich species from coming off first from the crucibles which, in turn, minimizes fractionation. The ramp profile depends upon whether the selenium alloy contains Te, As, or As and Te. Thus, the final evaporation is preferably conducted at the highest possible temperature without splattering. Typical temperature ranges for ramp heating are from an initial temperature of 20° C. to final temperature of 385° C. for alloys of Se-Te; an initial temperature of about 20° C. to a final temperature of about 450° C. for alloys of Se-As; and an initial temperature of about 20° C. to a final temperature of about 385° C. for alloys of Se-As-Te.

The first layer of multiple layered photoreceptors, such as a transport layer, may be deposited by any suitable conventional technique, such as vacuum evaporation. Thus, a transport layer comprising a halogen doped selenium-arsenic alloy comprising less than about 1 percent arsenic by weight may be evaporated by conventional vacuum coating devices to form the desired thickness. The amount of alloy to be employed in the evaporation boats of the vacuum coater will depend on the specific coater configuration and other process variables to achieve the desired transport layer thickness. Chamber pressure during evaporation may be on the order of about $4 \times 10^{-5}$ torr. Evaporation is normally completed in about 15 to 25 minutes with the molten alloy temperature ranging from about 250° C. to about 325° C. Other times and temperatures and pressures outside these ranges may be used as well understood by those skilled in the art. It is generally desirable that the substrate temperature be maintained in the range of from about 50° C. to about 70° C. during deposition of the transport layer. Additional details for the preparation of transport layers are disclosed, for example, in U.S. Pat. No. 4,297,4224 to H. Hewitt.

In large vacuum coaters utilized to deposit multiple selenium layers, the layers containing different additives, often utilize a pre-soak "hold" temperature to prevent condensation of selenium alloys that are to be deposited subsequent to the deposition of other selenium layers. These crucibles are normally maintained at an elevated temperature while the first coating layer is deposited. It has been discovered that this elevated temperature during the pre-soak hold period causes loss of selenium and selenium rich species from the selenium alloy in the "hold" crucibles and aggravates fractionation. By pre-crystallizing a selenium alloy at low temperatures along with avoiding long exposure of the selenium alloy to the high temperatures of the pre-soak hold, fractionation is reduced. Thus, high temperatures for crucibles containing alloys for subsequently deposited alloy layers are used only during the period of evaporation of the subsequently deposited alloys. For example, in multilayered photoreceptors where the alloy layer contains selenium alloys with tellurium and/or arsenic in a top or upper layer, the crucible for the top or upper layer alloy has in the past been kept at high temperatures, e.g. at about 190° C.–200° C., to prevent condensation of the base layer material onto the crucibles and the pellets or shot. It has now been determined that such high temperatures can allow the early sublimation of selenium and selenium rich species from the source alloys causing an increase in tellurium and/or arsenic concentration and thus a higher than desirable top surface tellurium and/or arsenic concentration on the photoreceptor film. This selenium sublimation promotes variability in the top film concentration, thus variability in photosensitivity, and/or charge acceptance and/or mechanical wear properties for example. Thus, for multi layered photoreceptors where the top alloy layer contains selenium alloys with tellurium and/or arsenic in a top or upper layer, the alloy is kept as cool as practical while avoiding evaporants from condensing on the top layer alloy crucibles during evaporation of the underlying layers. The temperature of the alloy should be kept in a temperature zone within which the vapor pressure of the selenium rich species is low, such as below about 130° C. It should be noted that while the pre-soak hold temperature should not be independently controlled above 130° C., it is possible that the heat of condensation may drive the top layer crucible temperature to about 160° C. for a short time.

Steep temperature ramp heating is desirable for every type of selenium alloy evaporation. Thus, for photoreceptors where the Se-Te alloy is in the last layer, a temperature ramp from 130° C. to about 385° C. in a period of about 15 minutes is satisfactory. Generally, depending on the specific alloy composition employed, the final temperature may range from about 300° C. to about 450° C. for Se-Te alloys.

The process of this invention prevents fusion of adjacent shot or pellets which renders difficult the weighing out and uniform spreading of shot or pellets in coater crucibles. The selenium alloy treatment process of this invention provides free-flowing crystallized selenium alloy bead or pellet particles thereby overcoming the alloy particle agglomeration problems encountered during crystallization. The improved process of this invention forms crystallized selenium alloy beads or pellets substantially free of agglomerates.

Moreover, tellurium and arsenic fractionation are controlled within narrower limits with the process of this invention. In addition, photoreceptor fabrication yields are improved. By creating crystal nuclei pre-crystallizing a selenium alloy at low temperatures along with avoiding long exposure of the selenium alloy in the hold crucibles at high temperature, fractionation is reduced. Thus high temperatures are used only during the period of evaporation.

Fractionation control on the process of this invention is sufficiently good that photoreceptors having good electrical properties may be fabricated with generator layers of selenium tellurium and selenium tellurium arsenic having thicknesses as large as 60 microns. Likewise, fractionation control is sufficiently good that photoreceptors having good electrical properties may be fabricated with transport layers of selenium arsenic alloys having thicknesses as large as 300 microns.

Also, because a pelletizing step is unnecessary, the labor and equipment intensive steps required for pelletizing may be eliminated. In addition, the possibility of material contamination in a grinding and pelletizing step is eliminated. The process of this invention does not require the use of expensive equipment, is easily scalable to produce production quantities, and does not tie up scarce vacuum coater resources for the pre-crystallization process. Crystallization is also achieved rapidly without the need of a high volume of "in process" material. Top surface arsenic concentrations can be reduced from several percent to below 1 percent with the materials of this process for SeAs alloys with nominal starting compositions composing less than 0.5 percent by weight of arsenic. Top surface tellurium concentrations can be reduced from in excess of 16 percent by weight to less than about 12 percent by weight with the materials of this process for SeTe alloys with nominal starting compositions comprising 10 percent or less by weight tellurium.

A number of examples are set forth herein below that are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE 1

Photoreceptor preparation runs were made. Each run was conducted with batches of amorphous (control) alloys and batches of crystalline alloys of arsenic and selenium prepared by the technique described herein and having the following compositions:

A. comprising about 99.5 percent by weight selenium and about 0.5 percent by weight arsenic, based on the total weight of the alloy, and about 20 parts per million chlorine, B. comprising about 99.65 percent by weight selenium and about 0.35 percent by weight arsenic, based on the total weight of the alloy, and about 12 parts per million chlorine, C. comprising about 98 percent by weight selenium and about 2 percent by weight arsenic, based on the total weight of the alloy.

These selenium-arsenic alloys were initially prepared as beads formed by water quenching droplets of a molten alloy having an average particle size of about 2200 micrometers. The resulting batches of alloy beads were thereafter divided into two groups, one group being subjected to a crystal nuclei forming treatment followed by a low temperature surface crystallization treatment followed by a final bulk crystallization treatment at a low temperature, and the other group being untreated and remaining in the amorphous state. The surface nucleation forming treatment involved loading and tumbling about 37.3 kg of selenium-tellurium-arsenic alloy beads having an average particle size of about 2200 micrometers in a mechanical blender 20 (Munson Blender, Model MX-55 Mina-Mixer, available from Munson Machinery Co.) for about 0.5 hour to about 1 hour. The blender comprised a horizontal cylinder having an inside diameter of about 50 cm. The cylinder was fitted with vanes extending axially along the length of the cylinder interior. The cylinder was rotated at about 2-5 rpm. Rotation of the cylinder caused the alloy beads to be carried upwardly by the vanes until the beads tumbled downwardly due to gravity. Less than about 20 percent of the alloy beads were fractured. The low temperature pre-crystallization treatment involved heating the abraded shot using open containers in an oven at the desired temperature. The heating was done in air at atmospheric pressure. The temperatures and times for the respective alloy batches were as follows: batch A, 62° C. for 2 hours; batch B, 61° C. for 3 hours; batch C, 66° C. for 3 hours.

The final crystallization treatment crystallization treatment involved raising the oven temperature and maintaining that temperature for the prescribed length of time. The temperatures and times for the respective alloy batches were as follows: batch A, 95° C. for 5 hours; batch B, 92° C. for 6 hours; batch C, 100° C. for 8 hours. The crystallized particles were 100 percent crystallized as determined by X-ray diffraction. The untreated amorphous selenium alloy particles were employed to fabricate a plurality of control electrophotographic imaging members and the treated crystallized selenium alloy particles were employed to fabricate a plurality of electrophotographic imaging members of this invention. All the electrophotographic imaging members were prepared by evaporation the alloy shot onto aluminum substrates. The selenium alloy was evaporated from stainless steel crucibles at an evaporation temperature of between about 280° C. and about 350° C. and an evaporation pressure between about $4 \times 10^{-4}$ torr and $2 \times 10^{-5}$ torr. The substrate temperature was maintained at about 55° C. during this evaporation coating operation. The resulting selenium alloy layers had the following characteristics:

The alloy A layer had a thickness of about 55 micrometers and comprised about 99.5 percent by weight selenium and about 0.5 percent by weight arsenic, based on the total weight of the alloy, and about 20 parts per million chlorine, at the top surface of the deposited layer, The alloy B layer had a thickness of about 55 micrometers and comprised about 99.65 percent by weight selenium and about 0.35 percent by weight arsenic, based on the total weight of the alloy, and about 10 parts per million chlorine, at the top surface of the deposited layer, and The alloy C had a thickness of about 55 micrometers and comprised about 98 percent by weight selenium and about 2 percent by weight arsenic, based on the total weight of the alloy.

The photoreceptors from the three batches were tested for top surface concentration of arsenic (TSA). Testing was effected by detaching the deposited film from the coated substrate and determining the arsenic concentration at the top surface by electron microprobe analysis. It was discovered that the top surface of photoreceptors from the amorphous alloy batches had an arsenic concentration significantly higher than the treated crystalline alloy batches. The results of the foregoing test are set forth in Table 1 below:

TABLE I

| Sample | 6 KV TSA (0.1 μm) | 17 KV TSA (0.5 μm) |
|---|---|---|
| A. (0.5 wt. % As) Shot - Amorphous | 1.7 | 3.1 |
| A. (0.5 wt. % As) Shot - Crystalline | 0.5 | 0.8 |
| A. (0.5 wt. % As) Shot - Crystalline | 0.5 | 0.5 |
| B. (0.35 wt. % As) Shot - Amorphous | 3.1 | 2.6 |
| B. (0.35 wt. % As) Shot - Crystalline | 0.4 | 0.8 |
| C. (2 wt. % As/Se) Shot - Amorphous | 23.5 | 19.8 |
| C. (2 wt. % As/Se) Shot - Crystalline | 0.4 | 2.1 |

The second column heading from the left in Table 1 represents the top surface arsenic concentrations in weight percent from electron microprobe analysis at 6KV beam energy where the mean excitation depth of detected X-rays is approximately 0.1 μm, and the third column from the left represents the top surface arsenic concentrations in weight percent from the same analysis but for a 17KV beam potential where the mean depth of excitation of detected X-rays is approximately 0.5 μm. Generally excellent fractionation characteristics are evident in the results shown in Table 1 for the treated crystallized materials while the performance of the amorphous control materials is much poorer. As a point of reference, the requirement to achieve excellent performance is a TSA of less than about 1 percent by weight based on the total weight of the photoconductive layer for the starting compositions represented by alloys A and B in this example. These layers are typically used as transport layer materials in multilayer photoreceptors in which a thin SeTe generator layer is deposited on top of the transport layer. Excellent performance of such photoreceptors is manifested in stable electrical cycling characteristics. Poor performance may be seen in the form of poor electrical cycling stability with consequent degradation of copy quality. This copy quality degradation can take a variety of forms but is most frequently manifested in appearance of high background on the copies.

EXAMPLE II

Photoreceptor preparation runs were conducted with batches of amorphous (control) and batches of crystalline alloys of tellurium and selenium having the following compositions:

A. comprising about 89.7 percent by weight selenium and about 10.3 percent by weight tellurium, based on the total weight of the alloy, B. comprising about 88 percent by weight selenium and about 12 percent by weight tellurium, based on the total weight of the alloy, C. comprising about 85.5 percent by weight selenium and about 14.5 percent by weight tellurium, based on the total weight of the alloy, D. comprising about 89.7 percent by weight selenium and about 10.3 percent by weight tellurium, based on the total weight of the alloy, These selenium-arsenic alloys were initially prepared as beads formed by water quenching droplets of a molten alloy having an average particle size of about 2200 micrometers. The resulting batches of alloy beads were thereafter divided into two groups, one of which was subjected to a surface nucleation forming treatment followed by a low temperature pre-crystallization treatment followed by a final crystallization treatment at a temperature just below the softening point of the alloy and the other group being untreated and remaining in the amorphous state. The crystal nuclei forming treatment involved loading and tumbling about 37.3 kg of selenium-tellurium-arsenic alloy beads having an average particle size of about 2200 micrometers in a mechanical blender 20 (Munson Blender, Model MX-55 Mina-Mixer, available from Munson Machinery Co.) for about 0.5 hour to about 1 hour. The blender comprised a horizontal cylinder having an inside diameter of about 50 cm. The cylinder was fitted with vanes extending axially along the length of the cylinder interior. The cylinder was rotated at about 2-5 rpm. Rotation of the cylinder caused the alloy beads to be carried upwardly by the vanes until the beads tumbled downwardly due to gravity. Less than about 20 percent of the alloy beads were fractured.

The pre-crystallization step comprised heating the abraded shot using open containers in an oven at the desired temperature. The heating was done in air at atmospheric pressure. The temperatures and times for the respective alloy batches were as follows: batch A, 65° C. for 3 hours; batch B, 68° C. for 4 hours; batch C, 66° C. for 5 hours; batch D, 65° C. for 3 hours.

The final crystallization step comprised raising the oven temperature and maintaining that temperature for the prescribed time period. The temperatures and times for the respective alloy batches were as follows: batch A, 96° C. for 5 hours; batch B, 100° C. for 6 hours; batch C, 110° C. for four hours; batch D, 96° C. for 5 hours. The treated crystallized particles were 100 percent crystallized as determined by X-ray diffraction. The untreated amorphous selenium alloy particles were employed to fabricate a plurality of control electrophotographic imaging members and the treated selenium alloy particles were employed to fabricate a plurality of electrophotographic imaging members of this invention. All the electrophotographic imaging members were prepared by evaporating the alloy shot onto aluminum substrates. These alloy batches were evaporated at a temperature of between about 350° C. and about 400° C. (see Tables 2 through 5 below) from stainless steel crucibles at a pressure of about $2 \times 10^{-5}$ torr. The substrate temperature was maintained at about 60° C. during this evaporation coating operation. The photoreceptors from the batches were tested for top surface concentration of tellurium (TST) by electron microprobe analysis. Testing was effected by detaching the deposited film from the substrate and determining the tellurium concentration at the top surface by X-ray diffraction. It was discovered that the top surface of photoreceptors prepared from the amorphous alloy batches had a tellurium concentration significantly higher than those prepared from the treated crystalline alloy batches. The resulting selenium-tellurium alloy layers had the characteristics listed in Tables II through IV below:

TABLE II

| | Batch A (10.3 Wt % Te) | | |
|---|---|---|---|
| | Film | TST | |
| Sample A | Thickness (μm) | 8 KV (0.1 μm) | 17 KV (0.5 μm) |
| Se—Te (10.3% Te) Shot - Amorphous Evaporation at 400° C. | 51 | 15.4 | 24.9 |
| Se—Te (10.3% Te) Shot - Crystallized Evaporation at 400° C. | 52 | 11.9 | 11.0 |
| Se—Te (10.3% Te) Shot - Amorphous Evaporation at 350° C. | 49 | 45.7 | 32.8 |
| Se—Te (10.3% Te) Shot - Crystallized Evaporation at 350° C. | 49 | 11.7 | 10.7 |

The third column heading from the left in Table II represents the top surface tellurium concentrations in weight percent from electron microprobe analysis at 8KV beam energy where the mean X-ray excitation depth for detected X-rays is 0.1 μm and the forth column from the left represents the top surface tellurium concentrations in weight percent from the same analysis but at 17KV beam energy where the mean X-ray excitation depth for detected X-rays is 0.5 μm.

TABLE III

| | Batch B (12 Wt. % Te) | | |
|---|---|---|---|
| | Film | TST | |
| SAMPLE B | Thickness (μm) | 8 KV (0.1 μm) | 17 KV (0.5 μm) |
| Se—Te Alloy (12% Te) Amorphous - Shot | 45 | 48.6 | 41.9 |
| Se—Te Alloy (12% Te) Crystallized - Shot | 45 | 12.3 | 12.7 |

TABLE IV

| | Batch C (14.5 Wt. % Te) | | |
|---|---|---|---|
| | Film | TST | |
| SAMPLE C | Thickness (μm) | 8 KV (0.1 μm) | 17 KV (0.5 μm) |
| Se—Te Alloy (14.5% Te) Amorphous - Shot | 50 | 36.8 | 50.3 |
| Se—Te Alloy (14.5% Te) Crystallized - Shot | 52 | 15.8 | 14.6 |

TABLE V

| | Batch D (10.3 Wt % Te) | |
|---|---|---|
| Depth in Microns | Te % by wt. | |
| | Pre-Crystallized | Amorphous |
| 0.1 | 11.5 | 39.3 |
| 5 | 11.8 | 11.6 |
| 10 | 11.6 | 9.0 |
| 15 | 12.1 | 7.9 |
| 20 | 11.4 | 7.3 |
| 25 | 11.0 | 6.4 |
| 30 | 10.8 | 5.8 |
| 35 | 10.0 | 6.3 |
| 40 | 10.5 | 5.8 |
| 45 | 8.8 | 6.4 |
| 50 | 8.6 | 5.5 |

Table V shows comparative tellurium concentrations through the evaporated films prepared from pre-crystallized and amorphous beads respectively. These compositional profiles come from electron microprobe analysis of cross sections of the evaporated films. The results shown in Tables II through V clearly indicate that amorphous beads show significant fractionation whereas the films formed from crystallized beads show very little fractionation. The photoreceptors coated from the precrystallized material are characterized by photosensitivities and charge acceptance characteristics in the desired range while those formed from amorphous material show excessive dark decay, poor charge acceptance and unacceptably high photosensitivies.

EXAMPLE III

An alloy material comprising about 88 percent by weight selenium and about 12 percent by weight tellurium, based on the total weight of the alloy (Batch B described in Example II) was initially prepared as beads formed by water quenching droplets of a molten alloy having an average particle size of about 2200 micrometers. The material was abraded and pre-crystallized as described in Example II for batch B. The final crystallized particles were 100 percent crystallized as determined by X-ray diffraction. The untreated amorphous selenium alloy particles were employed to fabricate a plurality of control electrophotographic imaging members and the treated selenium alloy particles were employed to fabricate a plurality of electrophotographic imaging members of this invention. All the electrophotographic imaging members were prepared by evaporating the alloy shot onto aluminum substrates. However, instead of rapidly raising the temperature of the alloy to evaporation temperatures, both the amorphous and crystallized alloy shot were held at 200° .C for about 8 minutes. These alloy batches were thereafter evaporated at a temperature of between about 350° C. and about 400° C. from stainless steel crucibles at a pressure of about $2 \times 10^{-5}$ torr. The substrate temperature was maintained at about 60° C. during this evaporation coating operation. The photoreceptors from the batches were tested for top surface concentration of tellurium (TST). Testing was effected by detaching the deposited film from the substrate and determining the tellurium concentration at the top surface by electron microprobe analysis. The resulting selenium-tellurium alloy layers had the characteristics listed in Table VI below:

TABLE VI

| | Batch B (12 Wt. % Te) | | |
|---|---|---|---|
| | Film | TST | |
| SAMPLE # | Thickness ($\mu$m) | 8 KV (0.1 $\mu$m) | 17 KV (0.5 $\mu$m) |
| Se—Te Alloy (12% Te) Amorphous - Shot | 10 | 42.1 | 32.3 |
| Se—Te Alloy (12% Te) Crystallized - Shot | 10 | 38.2 | 24.0 |

The results shown in Table VI, together with those of Table II batch B, demonstrate that holding the alloy at elevated temperatures (above 130 ° C.) under vacuum promotes the early loss of selenium rich species and thereby increases the level of fractionation.

EXAMPLE IV

An alloy material comprising about 99.5 percent by weight selenium, about 0.5 weight percent arsenic, and about 20 parts per million by weight chlorine based on the total weight of the alloy was initially prepared as beads formed by water quenching droplets of a molten alloy having an average particle size of 2200 micrometers. This material was precrystallized without benefit of the nucleation and surface crystallization steps. The alloy particles were placed in an oven at 95° C. for a period of 5 hours. At the end of this period the alloy was found to have softened and coalesced into a single mass. The required weighing and even distribution among the crucibles in the vacuum coater was thus prevented.

EXAMPLE V

An alloy material comprising about 99.5 percent by weight selenium, about 0.5 weight percent arsenic, and about 20 parts per million by weight chlorine based on the total weight of the alloy was initially prepared as beads formed by water quenching droplets of a molten alloy having an average particle size of 2200 micrometers. The particles were placed into an oven at 62° C. without benefit of mechanical abrasion and held at that temperature for a period of 5 hours. At the end of this time period the alloy was found not to have the dull grey appearance usually associated with formation of surface crystallization and furthermore the beads showed high levels of agglomeration.

EXAMPLE VI

An alloy material identical with that identified as Batch B of Example I and given a low temperature surface and bulk crystallization treatment, was combined with equal amounts of the same alloy material uncrystallized to give a 50/50 by weight blend.

Vacuum evaporated layers 150 micrometers thick were coated onto aluminum plates using the forementioned material at the following conditions:
Pressure of about 1x10-4 torr.
Substrate temperature of about 80° C.
Bulk evaporation during a slow ramp of about 240° C. to 260° C. over about 23 min., preceded by a 5 min r min ramp to 190° C., 3 min ramp to 215° C. and 3 min ramp to 240° C. A final ramp from 260° C. to 300° C. over 9 min and a 13 min hold at 300° C. was used to insure complete evaporation of the alloy material.

The resulting photoreceptors were tested for top surface arsenic (GSA) concentration using the electron microprobe analysis technique and found to have TSA's of 0.9 percent and 0.8 percent by weight arsenic at the 17kV test condition. Using 100 percent uncrystallized material evaporated as previously described in this example gave TSA's of form 3.2 percent by weight arsenic to 2.9 percent by weight arsenic at the 17kV test condition.

Although the invention ahs been described with reference to specific preferred embodiments, it is not intended to be limited thereto, rather those skilled in the art will recognize that variations and modifications made be made therein which are within the scope of the invention and within the scope of the claims.

What is claimed is:

1. A process for crystallizing particles of an alloy of selenium comprising providing particles of an alloy comprising amorphous selenium and an alloying component selected from the group consisting of tellurium, arsenic, and mixtures thereof, said particles having an average size of at least about 300 micrometers and an average weight of less than about 1000 mg, forming crystal nucleation sites on at least the surface of said particles while maintaining the substantial integrity of said particles, heating said particles to at least a first temperature between about 50° C. and about 80° C. for at least about 30 minutes to form a thin, substantially continuous layer of crystalline material at the surface of said particles while maintaining the core of selenium alloy in said particles in an amorphous state, and rapidly heating said particles to at least a second temperature below the softening temperature of said particles, said second temperature being at least 20° C. higher than said first temperature and between about 85° C. and about 130° C. to crystallize at least about 5 percent by weight of said amorphous core of selenium alloy in said particles.

2. A process for crystallizing particles of an alloy of selenium in accordance with claim 1 by first inducing surface nucleation sites on at least the surface of said particles by exposing said particles to radiation selected from the group consisting of ultraviolet radiation, electron beam radiation, gamma-ray radiation and X-ray radiation.

3. A process for crystallizing particles of an alloy of selenium in accordance with claim 1 including forming said surface nucleation sites on at least the surface of said particles by mechanically abrading the surfaces of said particles while maintaining the substantial integrity of said particles.

4. A process for crystallizing particles of an alloy of selenium in accordance with claim 1 wherein said particles of said alloy are beads of said alloy having an average particle size of between about 300 micrometers and about 3,000 micrometers.

5. A process for crystallizing particles of an alloy of selenium in accordance with claim 1 wherein said particles of said alloy are pellets having an average weight between about 50 mg and about 1000 mg, said pellets comprising compressed finely ground particles of said alloy having an average particle size of less than about 200 micrometers prior to compression.

6. A process for crystallizing particles of an alloy of selenium in accordance with claim 1 wherein said alloy comprises a halogen dopant.

7. A process for crystallizing particles of an alloy of selenium in accordance with claim 1 wherein said alloy comprises an alloy of selenium and arsenic comprising about 0.5 percent by weight arsenic and up to about 20 parts per million by weight halogen all based on the total weight of the alloy with the remainder being selenium.

8. A process for crystallizing particles of an alloy of selenium in accordance with claim 1 wherein said alloy comprises an alloy of selenium and arsenic comprising between about 1 percent by weight and about 2.5 percent by weight arsenic based on the total weight of the alloy with the remainder being selenium.

9. A process for crystallizing particles of an alloy of selenium in accordance with claim 1 wherein said alloy comprises an alloy of selenium and tellurium comprising between about 5 percent by weight and about 45 percent by weight tellurium and up to about 100 parts per million by weight halogen all based on the total weight of the alloy with the remainder being selenium.

10. A process for crystallizing particles of an alloy of selenium in accordance with claim 1 wherein said alloy comprises an alloy of selenium, arsenic and tellurium comprising between about 5 percent and about 45 percent by weight tellurium, between about 0.1 percent by weight and about 5 percent by weight arsenic and up to about 1,000 parts per million by weight halogen all based on the total weight of the alloy with the remainder being selenium.

11. A process for crystallizing particles of an alloy of selenium in accordance with claim 1 wherein said heating of said particles to a temperature between about 85° C. and and about 130° C. is maintained until 100 percent of said amorphous core of selenium alloy in said particles is crystallized.

12. A process for crystallizing particles of an alloy of selenium in accordance with claim 11 including preparing a two part mixture of particles having identical compositions, the particles in one part having cores that are 100 percent crystallized and particles in the other part having amorphous cores, said particles having amorphous cores comprising up to about 75 percent by weight of the total weight of said mixture.

13. A process for preparing an electrophotographic imaging member comprising providing particles of an alloy comprising amorphous selenium and an alloying component selected from the group consisting of tellurium, arsenic, and mixtures thereof, said particles having an average particle size of at least about 300 micrometers and an average weight of less than about 1000 mg, forming crystal nucleation sites on at least the surface of said particles while maintaining the substantial surface integrity of said particles, heating said particles to at least a first temperature between about 50° C. and about 80° C. for at least about 30 minutes to form a thin, substantially continuous layer of crystalline material at the surface of said particles while maintaining the core of selenium alloy in said particles in an amorphous state, and rapidly heating said particles to at least a second temperature below the softening temperature of said particles, said second temperature being at least 20° C. higher than said first temperature and between about 85° C. and about 130° C. to crystallize at least about 5 percent by weight of said amorphous core of selenium alloy in said particles, and rapidly heating said particles to a temperature between about 280° C. and about 400° C. in a vacuum coater to vacuum deposit said alloy onto an adjacent substrate.

14. A process for preparing an electrophotographic imaging member in accordance with claim 13 wherein said alloy comprises a halogen dopant.

15. A process for preparing an electrophotographic imaging member in accordance with claim 13 wherein said alloy comprises an alloy of selenium and arsenic.

16. A process for preparing an electrophotographic imaging member in accordance with claim 13 wherein said alloy comprises an alloy of selenium and tellurium.

17. A process for preparing an electrophotographic imaging member in accordance with claim 13 wherein said alloy comprises an alloy of selenium, arsenic and tellurium.

18. A process for preparing an electrophotographic imaging member in accordance with claim 13 wherein said heating of said particles to a temperature between about 85° C. and and about 130° C. is maintained until 100 percent of said amorphous core of selenium alloy in said particles is crystallized.

19. A process for preparing an electrophotographic imaging member in accordance with claim 13 comprising, prior to rapid heating said particles in a vacuum coater, preparing a mixture of said particles in which 100 percent of said amorphous core is crystallized and additional particles of an amorphous alloy comprising selenium and a dopant selected from the group consisting of tellurium, arsenic, and mixtures thereof, said additional particles having an average particle size of at least about 300 micrometers, and an average weight of less than about 1000 mg, said additional particles comprising up to about 75 percent by weight of the total weight of said mixture.

* * * * *